Feb. 11, 1958 S. W. SINCLAIR 2,822,949
FLUID-PRESSURE ROTATING CARRIAGE FOR LIFT TRUCKS
Filed June 17, 1953 2 Sheets-Sheet 1
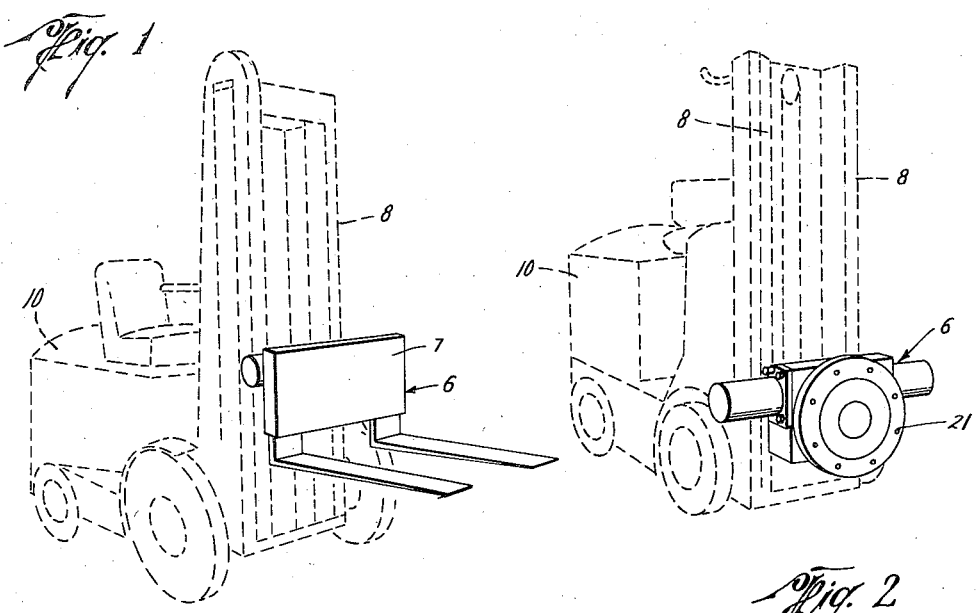
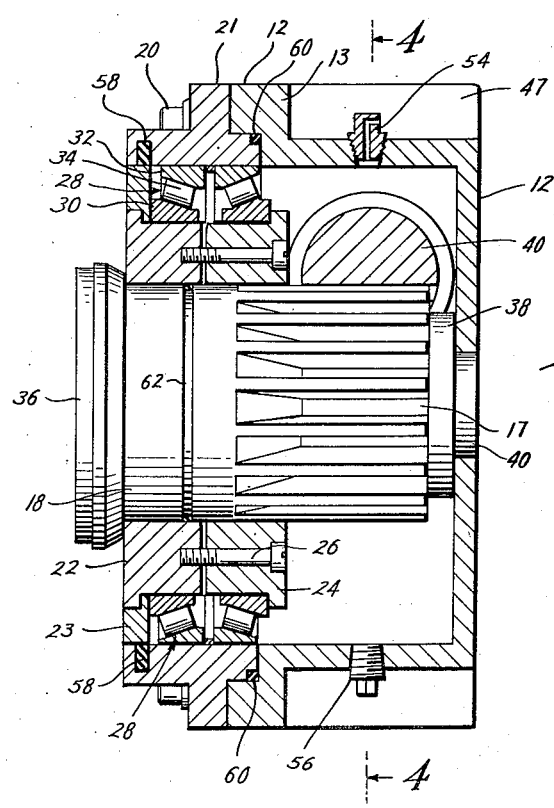
Stuart W. Sinclair
INVENTOR.
ATTORNEYS

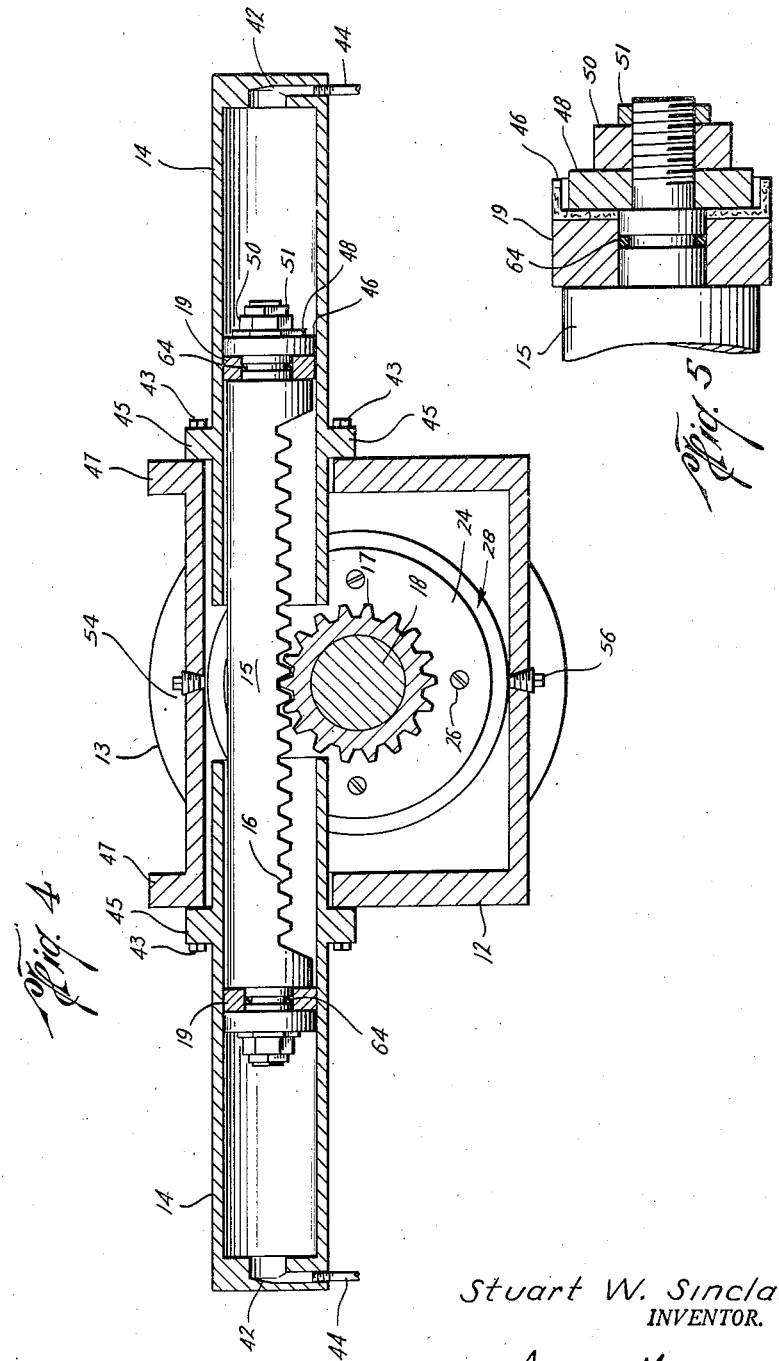

United States Patent Office 2,822,949
Patented Feb. 11, 1958

2,822,949

FLUID-PRESSURE ROTATING CARRIAGE FOR LIFT TRUCKS

Stuart W. Sinclair, Houston, Tex., assignor to Anderson, Clayton & Co., Houston, Tex., a corporation of Delaware Application June 17, 1953, Serial No. 362,233

7 Claims. (Cl. 214—701)

This invention relates to a fluid-powered rotating carriage and more particularly to improvements therein such as used on industrial trucks for changing the position of the load.

In the use of industrial trucks for handling and transporting loads from place to place, it is often desirable and necessary to provide means for the operator to rotate the load-engaging unit of the truck. Various means have been suggested to accomplish this result, among which are fluid motors to rotate the load-engaging elements, which are complicated and require considerable linkage to obtain necessary gear reduction for necessary torques. A further example of a rotating carriage is illustrated in United States Patent No. 2,541,268, granted February 13, 1951, on the application of Harold E. Milz.

The above and other rotating carriages have disadvantages in that they are complicated and hence expensive to manufacture, maintain and repair. In addition, they are often of such size and construction to hinder visibility of the operator and hinder loading and unloading in confined spaces, such as confined head room. Also, manual lubrication is usually required with its inherent disadvantages.

It is, accordingly, a general object of the present invention to provide a fluid-powered rotating carriage which is simple and relatively inexpensive to manufacture, maintain and repair and which is rugged and durable in use.

A further object of the present invention is the provision of such a fluid-powered rotating carriage utilizing a rack and pinion assembly actuated by fluid power in which the cylinder walls serve the double function of confining the fluid under pressure and acting as a guide for the rack member.

Yet a further object of the present invention is the provision of such a fluid-powered rotating carriage utilizing a piston and cylinder arrangement having a single piston having a rack to actuate the rotating table of carriage.

An additional object of the present invention is the provision of a fluid-powered rotating carriage which is self-lubricating.

A still further object and advantage of the present invention is the provision of such a fluid-powered unit which is compact so as to allow good visibility to the operator and permit loading and unloading in confined spaces, such as confined head room.

Yet a further object of the present invention is the provision of such a fluid-powered rotating carriage in which it is unnecessary to provide reduction gearing and linkage to obtain the necessary torques.

Other and further objects, features and advantages will be apparent from a description of an example of the invention given for the purpose of the disclosure. The present invention is particularly suitable for use in connection with industrial trucks for handling and transporting loads, and the description is directed to this particular adaptation. It will be understood, of course, that the fluid-powered unit of the present invention can be used and adapted for use as a fluid-powered unit for rotating loads on many other types of equipment.

The following description is taken in connection with the accompanying drawings, where like characters designate like parts throughout the several views, and where:

Figure 1 is a diagrammatic perspective view of a load-engaging carriage constructed according to the invention and illustrated secured to an industrial lift truck.

Figure 2 is a diagrammatic perspective view similar to that of Figure 1 with the front plate of the finger lift illustrated in Figure 1 removed, Figure 3 is a side elevation, partly in section, of the fluid-powered unit illustrated in Figures 1 and 2, Figure 4 is a cross section taken along the line 4—4 of Figure 3, and Figure 5 is a fragmentary enlargement of one of the piston heads illustrated in Figure 4.

Referring now to the drawings, and particularly to Figure 2, an example of the fluid-powered unit of the present invention is generally indicated by the reference numeral 6 to which is secured, as best seen in Figure 1, a conventional finger-lift type of load-engaging unit 7. Any type of load-engaging mechanism may be associated with the fluid-powered unit 6, and may be formed integrally therewith or may be secured thereto in any convenient or desired manner. As illustrated in both Figures 1 and 2, the fluid-powered unit 6 may be connected to the conventional vertical races 8 of a typical industrial lift track, generally designated by the reference numeral 10. Any conventional type lift truck may be used, and it is only necessary that the industrial truck have the usual hydraulic connections to which the power connections of the fluid-powered unit 6 may be connected.

Referring now to Figure 4, a housing generally indicated by the reference numeral 12, has the opposed cylinders 14 open at their inner ends and closed at their outer ends disposed in opposite sides of its upper portion in which the piston 15 is slidable. The piston 15 has a rack 16 formed at its lower portion which meshes with the pinion 17 formed on the pinion shaft 18 journaled in the housing 12.

It is noted that the piston 15 is an elongated piston which has the piston heads 19 disposed at each end which move in the opposed cylinders 14. The opposed cylinders 14 may be a single elongated cylinder which is split at the middle, or which may be continuing and have an open portion at its lower portion for reception of the pinion 17 meshing with the rack 16. Thus, movement of the piston 15 causes a rotation of the pinion 17 and the pinion shaft 18 to provide the necessary rotation as will be apparent later.

The cylinders 14 may be mounted on or secured to the housing 12 in any satisfactory manner; however, by providing the bolts 43 through the shoulders 45 of the cylinders 14, the cylinders 14 may readily be assembled or disassembled in assembling the structure or disassembling the fluid-powered unit for repairs and the like.

As best seen in Figure 3, the housing 12 has the outwardly-extending flange 13 to which is bolted by the bolts 20 an outer race retainer 21. Thus, access to the interior of the housing 12 is obtained by removing the outer race-retainer ring 21 by unscrewing the bolts 20. This permits ease of assembling and disassembling the fluid-powered unit for initial assembly, repairs, maintenance work and the like.

Secured to the outer periphery of the pinion shaft 18 and rotatable therewith are the inner race-retainer rings 22 and 24 which fit snugly about the pinion shaft 18 and may be secured to one another by the bolts 26. Any suitable bearing means may be provided to permit free rotation of the pinion shaft 18 and illustrated in Figure 3 are a pair of opposed tapered roller-bearing assemblies generally indicated as 28, each of which includes the inner races 30 disposed snugly about the inner race-retainer rings 22, the outer pair of race rings 32 disposed snugly inside the outer race-retainer ring 21 and the tapered roller bearings 34. The arrangement illustrated is conventional and any suitable bearing means may be provided to permit free rotation of the pinion shaft 18.

Secured to and moving with the inner race-retaining rings 22 is a race-retaining ring 23 which aids in confining the roller-bearing assemblies in position.

At the forward end of the pinion shaft 18, there is provided a face plate 36 to which may be secured the conventional finger lift 7 illustrated in Figure 1, or which may be an integral portion of/or secured to any load-engaging assembly.

The rearmost end of the pinion shaft 18 is stepped downwardly in diameter at 40 and provided with a thrust ring 38 to prevent rearward movement of the shaft and absorb axial shock thrusts which may be encountered in operation. The reduced diameter portion 40 is journaled in the rear plate of the housing 12. Thus, the pinion shaft 18 and associated parts may rotate freely in the housing 12.

Referring again to Figure 4, means are provided to supply fluid power to move the piston 15 in the piston cylinders 14 and, for this purpose, fluid or hydraulic ports 42 are provided in the outer ends of the cylinders 14 to which are threaded or otherwise connected the hydraulic fluid leads 44 which, in turn, are connected to conventional hydraulic equipment on the industrial lift truck 10, not illustrated. Hydraulic supply means, controls therefor, are well known, are conventional and in widespread use, and no detailed description thereof is deemed necessary.

Disposed on each end of the elongated piston 15 and adjacent the piston heads 19 are suitable packing, such as the cup packing 46 held in place by the follower plate 48, the castle nut 50 and the cotter key 51. Thus, the pistons 19, cup packings 46 and follower plate 48 are held in position at the extremities of the piston 15 by the arrangement illustrated, although they may be otherwise secured thereto.

It seems apparent that the hydraulic pressure moving the piston 15 will always be in a direction toward the interior of the cylinders 14 and the housing 12 and, accordingly, any leakage of hydraulic fluid beyond the packing 46 will be into the interior of the housing 12. Thus, although a good seal is provided at each end of the piston 15, there is a slight amount of leakage of hydraulic fluid into the housing 12 so that manual lubrication of the pinion shaft and associated parts is unnecessary except in unusual circumstances.

For convenience, and as best seen in Figure 3, a vapor plug 54 is provided in the upper portion of the housing 12 and a drain plug 56 is provided in the lower portion of the housing 12.

All parts are suitably sealed to prevent leakage and, for this purpose, the packing 58 is provided at the juncture of the outer race-retainer ring 21 and the race-retainer ring 23, the packing 60 is provided at the juncture of the inner portion of the outer race-retainer ring 21 and the flange 13 of the housing 12 and an O-ring 62 is disposed about the pinion shaft 18 as well as the O-ring 64 disposed about the extending shafts at each end of the elongated piston 15.

In operation, the fluid-powered unit or carriage may be secured to any industrial lift truck having satisfactory hydraulic connections and controls, such as to the vertical races 8 of the lift truck 10 illustrated in Figures 1 and 2. In addition, any load-engaging means may be secured to the face plate 36, such as the finger lift 7, or the load-engaging means may be formed integrally with the fluid-powered unit.

When used in the manner illustrated in Figure 1, the fluid-powered leads 44 are connected to the hydraulic system and controls of the industrial truck, not shown, and by manipulation of these controls, the truck operator applies fluid power alternately to either of the leads 44 which will cause the desired movement of the piston 15 (see Figure 4) which will drive the pinion 17 and pinion shaft 18 thereby rotating the rotary table or face plate 36 and the finger lift 7, as desired. This movement can be reversed by introducing hydraulic fluid under pressure into the other cylinder 14 by means of the hydraulic system and controls on the industrial lift truck. By maintaining equal pressure on opposite sides of the piston 15, the finger lift 7 may be held in any desired position.

As indicated heretofore, the power unit for rotating carriages is self-lubricating in that the fluid used in the cylinders 14 is a lubricant and some will seep or leak past the packings 46 and piston heads 19 because of the lower pressure in the housing 12. This fluid lubricates the inner walls of the cylinders 14, the rack 16, the pinion 17, pinion shaft 18, and the packing elements illustrated prevent leakage of this fluid from the housing 12 while the escape vent 54 permits vapors to leave the housing 12 before pressure in it builds up sufficiently to force any of the lubricant through the various packing means. The drain plug 56, of course, permits drainage of this fluid at any time desired.

It is noted in the fluid-powered unit that no piston rods are provided, but that a single elongated piston is provided which moves in the cylinders 14 which serve as guides for the rack 16 formed at the lower portion of the piston 15.

Thus, the present invention is easily constructed, assembled, repaired and maintained and yet is rugged and durable in use. It is apparent that the present invention is less expensive than other fluid-powered rotating carriages for the additional reasons that the rack and pinion assembly are the only moving parts and reduction gearing, linkage, piston rods and the like, have been eliminated and are unnecessary. Also, the simple construction makes the fluid-powered unit small and compact so that loading and unloading are not impeded in confined spaces and the field of vision of the operator of the truck on which the fluid-powered unit is mounted is not impaired.

The present invention, therefore, is well suited to carry out the above objects and others inherent therein and has the advantages incident thereto.

While only a single example of the invention has been given for the purpose of illustration, numerous changes in details and rearrangement of parts will suggest themselves to those skilled in the art and, accordingly, it is desired to be limited only by the spirit of the invention and the scope of the appended claims.

What is claimed is:

1. The combination with an industrial lift truck including an upright hoist assembly of a rotating load-engaging assembly, said rotating load-engaging assembly comprising, a housing fixed to the hoist assembly whereby the housing is adapted to be raised and lowered, a cylinder assembly carried by and extending completely through the housing, an elongated piston slidably disposed in the cylinder assembly, a rack on a side of the piston, a pinion chamber in the cylinder assembly within the housing, a pinion shaft journaled in the housing and extending proximate the rack, a pinion on the shaft meshing in the pinion chamber with the rack, means proximate each end of the cylinder assembly to provide hydraulic pressure to the piston for reciprocating the piston and thereby driving the pinion and pinion shaft, a rotary table connected to the pinion shaft and disposed exteriorly of the housing, and load-engaging means connected to the rotary table.

2. The combination with an industrial lift truck including an upright hoist assembly of a rotating load-engaging assembly, said rotating load-engaging assembly comprising, a housing fixed to the hoist assembly whereby the housing is adapted to be raised and lowered, a pair of oppositely-disposed and longitudinally-aligned cylinders carried by the housing, said cylinders being spaced from one another and open at their inner ends, an elongated piston slidably-disposed in said cylinders, a rack on a side of the piston, a pinion shaft journaled in the housing, a pinion on the pinion shaft meshing with said rack and positioned in the space between the cylinders, a turntable connected to one end of the pinion shaft and disposed exteriorly of the housing, load-engaging means connected to the turntable, and means proximate an outer end of each cylinder to provide hydraulic pressure to the piston for reciprocating the piston in the cylinders and thereby driving the pinion, pinion shaft, turntable and load-engaging means.

3. In a lift truck assembly having an upright hoist assembly, a housing mounted on the hoist assembly whereby the housing is adapted to be raised and lowered, a pair of oppositely-disposed and longitudinally-aligned cylinders secured to the housing, said cylinders being spaced from one another and open at their inner ends, said inner ends being positioned inside the housing, an elongated piston slidably-disposed in said cylinders, a rack on the side of the piston, a pinion shaft journaled in the housing in the space between the cylinders, the pinion on a pinion shaft meshing with the rack, a turntable connected to the pinion shaft and disposed exteriorly of the housing, load-engaging means connected to the turntable, and means proximate outer ends of each cylinder to provide fluid pressure to the piston for moving the piston and thereby driving the pinion, the pinion shaft, the turntable and the load-engaging means.

4. In a lift truck assembly having an upright hoist assembly, a housing mounted on the hoist assembly whereby the housing is adapted to be raised and lowered, a pair of oppositely-directed and longitudinally-aligned cylinders, said cylinders being spaced from one another and open at their inner ends, the inner ends being disposed interiorly of the housing, an elongated piston slidably-disposed in said cylinders, a rack on a side of the piston, a pinion shaft journaled in the housing and disposed in the space between the cylinders, a pinion on the pinion shaft meshing with the rack, load-engaging means exterior of the housing and fixed on the pinion shaft, and means proximate an outer end of each cylinder for providing hydraulic fluid to the piston for moving the piston and thereby driving and rotating the pinion, the pinion shaft, and the load-engaging means.

5. In a lift truck assembly having a hoist mechanism, a turntable frame mounted on the hoist mechanism whereby the turntable frame is adapted to be raised and lowered, a pair of oppositely-disposed and longitudinally-aligned guide members carried by the frame, said guide members being spaced from one another and open at their inner ends, a slide in the guide members, a rack formed on a side of the slide, a pinion shaft journaled in the frame, a pinion on the pinion shaft meshing with the rack and positioned in the space between the guide members, a piston head on each end of the slide, means proximate each end of the slide for providing fluid pressure to the piston heads from moving the slide and thereby rotating the pinion and the pinion shaft, and load-engaging means connected to the pinion shaft and disposed exteriorly of the turntable frame.

6. In a lift truck assembly having an upright hoist mechanism, a turntable housing mounted on the hoist assembly whereby the housing is adapted to be raised and lowered, a pair of oppositely-disposed and longitudinally-aligned guide members carried by the housing, said guide members being spaced from one another and open at their inner ends, a slide in the guide members, a rack formed on a side of the slide, a pinion shaft journaled in the housing, a pinion on the pinion shaft meshing with the rack and positioned in the space between the guide members, a piston head on each end of the slide, a turntable connected to the pinion shaft and disposed exteriorly of the housing, load-engaging means secured to the turntable, and means proximate each end of the guide members for providing fluid pressure to the piston heads for moving the slide and thereby rotating the pinion, the pinion shaft, the rotary table and the load-engaging means.

7. The combination of claim 2 in which the rack is on a lower side of the piston whereby any leakage of hydraulic pressure past the piston provides lubrication by gravity flow through the inner ends of the cylinders to the rack and pinion.

References Cited in the file of this patent
UNITED STATES PATENTS

| | | |
|---|---|---|
| 2,086,814 | McCollum | July 13, 1937 |
| 2,286,661 | Warner | June 16, 1942 |
| 2,292,336 | Farnham | Aug. 4, 1942 |
| 2,389,654 | Van Der Werff | Nov. 27, 1945 |
| 2,541,268 | Milz | Feb. 13, 1951 |
| 2,595,131 | Ehmann | Apr. 29, 1952 |
| 2,599,524 | Lehmann | June 3, 1952 |

UNITED STATES PATENT OFFICE
CERTIFICATE OF CORRECTION

Patent No. 2,822,949 February 11, 1958

Stuart W. Sinclair

It is hereby certified that error appears in the printed specification of the above numbered patent requiring correction and that the said Letters Patent should read as corrected below.

Column 6, line 13, for "from" read -- for --.

Signed and sealed this 6th day of May 1958.

(SEAL)

Attest:

KARL H. AXLINE
Attesting Officer

ROBERT C. WATSON
Commissioner of Patents